US005653675A

United States Patent [19]
Kanno et al.

[11] Patent Number: 5,653,675
[45] Date of Patent: Aug. 5, 1997

[54] BIOREMEDIATION PROCESS FOR POLLUTED SOIL WATER SYSTEM

[75] Inventors: Tsunehiro Kanno; Yasuko Tomida, both of Atsugi; Junji Ohyama, Yamato; Tomoko Maruyama; Tsuyoshi Nomoto, both of Atsugi, all of Japan

[73] Assignee: Canon Kabushiki Kaisha, Tokyo, Japan

[21] Appl. No.: 255,983

[22] Filed: Jun. 8, 1994

[30] Foreign Application Priority Data

Jun. 10, 1993 [JP] Japan ..................... 5-138714
Mar. 30, 1994 [JP] Japan ..................... 6-060664

[51] Int. Cl.$^6$ ..................................... A62D 3/00
[52] U.S. Cl. .................. 588/249; 210/610; 405/128
[58] Field of Search .................... 588/249, 258; 405/128, 129; 210/610, 611, 764

[56] References Cited

U.S. PATENT DOCUMENTS

| | | | |
|---|---|---|---|
| 3,803,029 | 4/1974 | Blecharczyk | 210/16 |
| 5,232,850 | 8/1993 | Casida | 435/253.3 |
| 5,236,677 | 8/1993 | Torres-Cardona et al. | 425/230 |

*Primary Examiner*—Dennis L. Taylor
*Attorney, Agent, or Firm*—Fitzpatrick, Cella, Harper & Scinto

[57] ABSTRACT

An eliminator for eliminating microorganisms which catch and eat pollutant-degrading microorganisms from a region to be decontaminated in a soil is applied to the region to protect the pollutant-degrading microorganisms from being eaten, whereby a soil remediation effect can be enhanced.

12 Claims, 3 Drawing Sheets

BIOREMEDIATION PROCESS FOR POLLUTED SOIL WATER SYSTEM

BACKGROUND OF THE INVENTION

1. Field of the Invention

The present invention relates to a bioremediation process for degrading pollutants by the utilization of the substance conversion mechanism of microorganisms to make them harmless and to thus decontaminate a soil water system polluted with the various environmental pollutants.

2. Related Background Art

As a result of the diversification of industries and the dumping of wastes without consideration for a natural ecological system, pollutants which are hard to degrade are now accumulated in soils in districts in the world. Accordingly, the pollutants leak into underground water systems, so that the polluted districts are growing larger. In these pollutants which are hard to degrade, substances such as trichloroethylene and PCB which are extremely harmful to human bodies are present, which is a large social problem.

As measures for the decontamination of such a polluted soil water system, techniques which have now been practiced are a method of pumping up groundwater and then exposing it to the atmosphere, a method of subjecting the polluted soil water system to a pollutant adsorption removal treatment with active carbon, a method of extracting volatile pollutants from the soil under reduced pressure, a process of air-drying the polluted soil, or the like.

However, these methods have a problem that the soil must be dug up over an extensive area to remove the pollutants, and a problem that the diffusion of the harmful gas into the atmosphere cannot be completely prevented, and the like. These problems have an adverse influence on the environment.

As understood from the foregoing, the environmental pollutants are composed of various kinds of substances and their amounts are very large, and the polluted ranges also often extend inconveniently. In consequence, in the cause of environmental decontamination, it is not always practical to depend upon physical and chemical means alone in view of the energy and cost required for the decontamination treatment.

Accordingly, much attention has been paid to various substance conversion mechanisms which microorganisms exhibit, and bioremediation is expected in which the environmental pollutants can be degraded by utilizing microorganisms to make them harmless. The substance degrading ability of the microorganisms is based on reaction with the aid of enzymes which they have, and hence, the bioremediation has suitable characteristics from the viewpoint of environmental safeguards. For example, reaction conditions are milder, the consumption of energy is smaller, the production of by-products is smaller, and suitability for an in-situ treatment and anon-site treatment for directly treating a polluted region is better as compared with conventional chemical reaction.

The bioremediation utilizing the microorganisms can fundamentally be classified into two cases. In the first case, the microorganisms originally present in the polluted region are utilized. In this case, the degrading ability of the microorganisms which have naturally grown by utilizing the pollutants as an energy source is extended, and the extended degrading activity is enhanced. In the second case, the microorganisms which are excellent in the pollutant-degrading ability and which are not derived from the polluted region are artificially introduced into the polluted region. As the microorganisms which can be used in this case, there are microorganisms separated from a natural world, or microorganisms in which the pollutant-degrading ability is artificially enhanced by a technique such as gene manipulation or mutagenesis and which can easily be discharged into the environment without any problem.

However, the pollutant degrading activity is not always obtained in the region to be decontaminated by the microorganisms for decontaminating the polluted region which are present in the soil or are newly administered to the soil. Most of the microorganisms are generally passive to the given circumstances and they sensitively react thereto, and for this reason, it is necessary that the circumstantial conditions given to the microorganisms be properly controlled to heighten their decontamination ability. As techniques for this control, there are a method of spraying nutrients for the microorganisms on the soil in order to activate the pollutant-degrading ability of the microorganisms present in the soil or newly administered to the soil, a method of stirring and aerating the soil to make it aerobic, and the like.

However, the soil forms a natural ecological system, and in the soil, there is a food chain constituted of competition between the microorganisms and the hierarchical structure of the predator and the prey microorganisms. Most of the microorganisms which can be expected as the pollutant-degrading microorganisms are mainly bacteria, but in the soil, the bacteria is in a lowest nutrient stratum at which they grow utilizing organic substances derived from plants or animals as a nutrient source. At a stratum above these bacteria, there are protozoa such as rhizopods (amoebae and the like) and ciliates, and they eat the bacteria. Therefore, if the pollutant-degrading bacteria are eaten by these creatures in the soil and the number of the bacteria decreases, the degradation effect of the pollutants noticeably deteriorates. Therefore, it is desired to develop a technique by which the degrading bacteria are protected from being eaten so that the degrading bacteria may be allowed to remain in the soil. However, the bioremediation utilizing the microorganisms has been merely applied for a short period of time since its development, and therefore as the survival technique of the degrading bacteria in the soil, a process has been tried in which the degrading bacteria are supported in a porous carrier or the like to protect the degrading bacteria from being eaten by the protozoa. However, in order to disperse, in the soil, a carrier having a larger particle diameter than the soil particles, an operation such as digging and stirring of the soil which has a large environmental load is not avoidable, and in this case, the feature of the in-situ treatment of the bioremediation cannot be utilized.

SUMMARY OF THE INVENTION

The present invention has been attained with the intention of solving the problem of bioremediation utilizing microorganisms that the pollutant-degrading microorganisms are eaten by other creatures, and an object of the present invention is to provide a technique by which the pollutant-degrading microorganisms are protected from being eaten by the other creatures to increase the remaining microorganisms.

A bioremediation process of the present invention for achieving the above-mentioned object is directed to a bioremediation process of a soil water system by pollutant-degrading microorganisms which comprises the step of using, in a region to be decontaminated, a predatory microorganism eliminator for eliminating predatory microorganisms present in the soil water system from the region to be decontaminated.

DETAILED DESCRIPTION OF THE PREFERRED EMBODIMENTS

Figure 1:
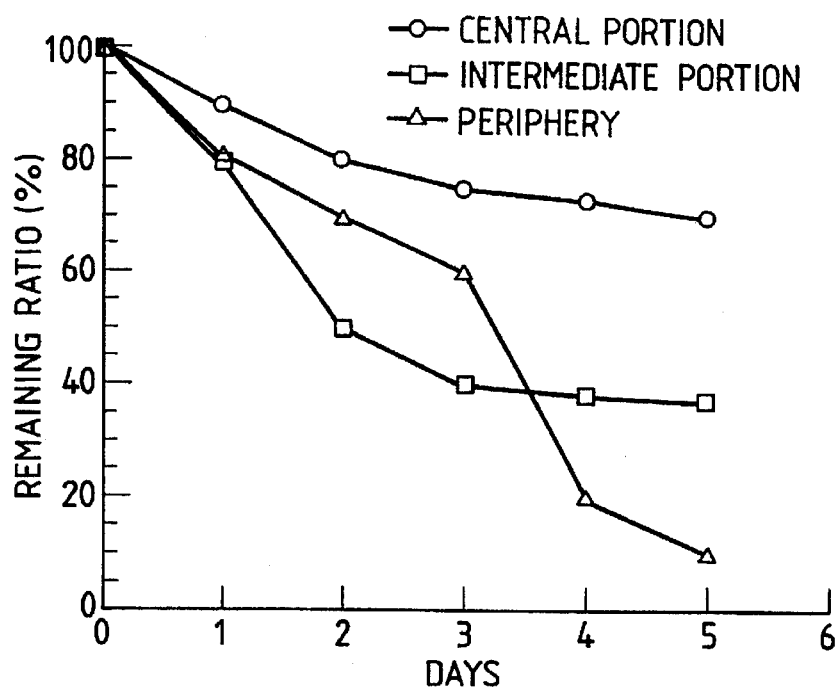
FIG. 1 is a graph showing a change with time of remaining ratios of bacteria (which are calculated regarding the number of the bacteria at the time of the start of an experiment as 100%) at sampling sites in Example 1.

As a predatory microorganism eliminator for use in the present invention, there can be used a substance for inducing the chemotaxis of predatory microorganisms, or the like. The predatory microorganism eliminator using the substance for inducing the chemotaxis stimulates the chemotaxis which the predatory microorganisms have, thereby eliminating them from a region to be decontaminated. In general, the chemotaxis of the microorganisms can be classified into the positive and the negative chemotaxis. For example, the positive chemotaxis of the microorganisms means a phenomenon where the microorganisms sense a concentration gradient of the substance for inducing the chemotaxis and move toward the rising concentration of the substance. The negative chemotaxis of the microorganisms is opposite to the positive chemotaxis, and it means a phenomenon where the microorganisms sense a concentration gradient of the substance for inducing the chemotaxis and move toward the lowering concentration of the substance. Therefore, pollutant-degrading microorganisms can be protected from the predatory microorganisms by administering, to the region to be decontaminated or its adjacent region, a substance for causing the predatory microorganisms to exert the chemotaxis and to thus move out of the region to be decontaminated.

As such a substance for inducing the chemotaxis, various substances are known, and the suitable substance can be selected in compliance with the kind of predatory microorganisms to be eliminated. Examples of the usable substance include cyclic AMP, inositol-3-phosphoric acid and calcium ions for cellular slime molds; various metallic ions and chelating agents thereof for amoebas; and various metallic ions, aliphatic alcohols and organic acids for tetrahymenas and paramecia. Furthermore, the predatory microorganisms usually exert the positive chemotaxis to a substance which can become a nutrient source, and hence such a substance can also be used.

When a substance for inducing the negative chemotaxis to the predatory microorganisms is used, this substance is directly administered to the region to be decontaminated. Conversely, when a substance for inducing the positive chemotaxis is used, the concentration gradient of this substance is formed so that the predatory microorganisms may move out of the region to be decontaminated.

Anyway, in the case that the chemotaxis is utilized, the concentration gradient of the substance for inducing the chemotaxis is necessary, and so the predatory microorganism eliminator is administered so that such a concentration gradient is formed. In this connection, as the predatory microorganism eliminator, any substance can be utilized without any restriction, so long as it can provide a desired elimination effect. A substance which is not harmful to the environment and which does not have a bad influence thereon, even when administered into the environment is preferable. In utilizing the chemotaxis, there can be used many substances for inducing the chemotaxis which are not harmful to the environment and which do not or scarcely have a bad influence thereon, and the safe substances can be advantageously selected from many substances. Furthermore, as an administration method of the predatory microorganism eliminator, the predatory microorganism eliminator can be sprayed on the soil, if necessary, together with a carrier and a diluent. Alternatively, a suitable device which can release the eliminator on the predetermined region can be used. For example, the eliminator can be directly placed in a container made of a porous substance or a substance through which the above-mentioned chemotaxis-inducing substance can penetrate, or it can be placed in a suitable absorption holder from which the eliminator can be gradually released, and the container or holder containing the eliminator can be then used. In utilizing the chemotaxis, the concentration gradient of the eliminator can be formed by selecting the amount of the eliminator and a spray position or an installation position of the release device.

As the microorganisms for decontaminating the polluted substance in the present invention, there are used microorganisms having an ability capable of, for example, degrading a pollutant to decontaminate the region to be decontaminated, and the microorganism are selected in compliance with the kind of pollutant to be decontaminated.

For example, it is known that *P. putida, P. cepacia, P. fluorescens* and the like belonging to a Pseudomonas genus degrade trichloroethylene (TCE), trichloroethane and the like under aerobic conditions, and it is also known methanotrophic bacteria belonging to a Methylosinus genus and a Methylocystis genus as well as ammonia-oxidizable bacteria (nitrifying bacteria) such as a Nitrosomonas genus have the strong TCE degradation ability. In the present invention, these known and commercially available strains can be used.

Furthermore, it is known that anaerobic bacteria have a strong dehalogenation ability, and it is known that strains belonging to a Methanosarcina genus, an Acetobacterium genus and an Agrobacterium genus degrade tetrachloroethylene (perchloroethylene; PCE), carbon tetrachloride, trichloroethane and the like, and in the present invention, strains belonging to these genera can be utilized. In addition, there can also be used bacteria isolated from a natural world and identified as novel genus, species or strains. These bacteria may be obtained by carrying out enrichment culture of field samples with a pollutant. Moreover, other bacteria having the degradation ability can also be used which can be obtained by cloning genes for coding enzymes capable of degrading the pollutant in question, and then introducing the cloned genes into the bacteria so as to improve the degradation ability.

These microorganisms may be microorganisms originally present in the region to be decontaminated in the soil (indigenous microorganisms) or microorganisms artificially foreign from the outside to the region to be decontaminated (foreign microorganisms). In addition, the microorganisms may be isolated and identified, or it may be a mixed culture of unidentified microorganisms.

As the indigenous microorganisms, there can be used microorganisms originally having characteristics capable of degrading the pollutant to make it harmless, microorganisms which possess characteristics capable of degrading the pollutant to make it harmless in the presence of the pollutant, or microorganisms having an ability to degrade the pollutant and to make it harmless which have been activated up to a practical level by the addition of nutrients to the soil, an aeration treatment for making the soil aerobic, or the like.

On the other hand, as the foreign microorganisms, there can be used microorganisms originally having characteristics capable of degrading the pollutant to make it harmless, or microorganisms obtained by giving, to microorganisms having no ability to degrade the pollutant and to make it harmless, this ability by a technique such as the induction of mutation or genetic engineering. The process for imparting the above-mentioned ability to degrade the pollutant and to make it harmless by the mutation can be achieved by selecting microorganisms such as the indigenous microorganisms which have a high remaining ratio in the soil or which are suitable for the environment of the region to be decontaminated, and then mutating them. This process has an advantage that the remaining ratio of the microorganisms for decontaminating the polluted soil can be further increased.

The soil water system in the present invention means a region which contains a large amount of water in the soil and in which soil particle masses are continuously connected each other via water, i.e., a region in which continuous layers of water are formed in the soil. In the case of the decontamination of the soil having a low water content, plenty of water is fed to the soil to be decontaminated, and the resulting soil water system can be treated by the method of the present invention.

More specifically, the soil is constituted of a solid phase comprising soil particles, a liquid phase comprising water and a gaseous phase. A soil layer where an occupation ratio of the gaseous phase is low and spaces among the soil particles are substantially filled with water is called a saturated layer, and another soil layer not filled therewith is called an unsaturated layer. The soil forms a layer structure comprising a surface layer soil, a sand layer, a clay layer and a gravel layer in a downward direction from the ground surface. The water level of underground water fluctuates but often resides in the sand layer. The soil under the water level of the underground water is a saturated layer, and the soil above the water level is an unsaturated layer. However, even above the water level of the underground water, another saturated layer which is not connected to the underground water system is formed sometimes, depending upon conditions such as the presence of the water-unpermeable soil layer and rainfall.

The saturated layer in the present invention means a region where the continuous layers of water are connected to each other regardless of its present site in the soil layer. In such a region, the water constituting the saturated layer may not move and may stagnate in the certain region sometimes. Furthermore, the underground water generally includes all water present in the underground, but an underground water layer in the present invention means a region which is present under the underground water level and which forms the saturated layer. In the underground water layer, the flow of water often occurs owing to water of a water source, rainwater in a basin and the like, and in this layer, the underground water moves as a continuous fluid through the spaces among the soil particles.

In the case that the polluted region to be decontaminated is the saturated layer, most of the spaces among the soil particles are occupied with water to form the continuous layer of water. Therefore, when no flow of water exists or the flow of water is slower than the diffusion rate of the chemotaxis-inducing substance, the negative concentration gradient of the added substance is formed according with the natural diffusion from its addition point toward its periphery. Furthermore, when the movement speed of the underground water is faster than the diffusion rate of the chemotaxis-inducing substance, the movement of the substance toward the downstream direction of the underground water takes place, and so the negative concentration gradient of the added substance is formed around the underground water flow.

On the other hand, in unsaturated layer which does not reach the underground water belt region, a water content ratio in the soil is low, so that any continuous water layer is not formed. When such an unsaturated layer is the polluted region to be decontaminated, water in an amount enough to form the continuous layer of water is beforehand fed to the polluted region to be decontaminated, and the chemotaxis-inducing substance is then added, whereby the process of the present invention can be applied thereto. Furthermore, the water flow can be added after the addition of the chemotaxis-inducing substance, whereby the negative concentration gradient of the chemotaxis-inducing substance is formed along the water flow.

According to the present invention, microorganisms which catch and eat pollutant-degrading microorganisms can be controlled in a soil region to be decontaminated, i.e., in-situ, whereby the remains of the pollutant-degrading microorganisms are maintained and a pollutant-degrading activity can be effectively kept up in the region to be decontaminated.

In addition, the present invention is suitable for the on-site treatment of bioremediation utilizing the microorganisms and can further utilize an advantage that energy consumption and environmental load are small.

Now, the present invention will be described in more detail with reference to examples, but the scope of the present invention should not be limited to these examples.

EXAMPLE 1

A cylindrical container having 1 m diameter and a depth of 50 cm was filled with Kanuma soil sampled from the outdoors, and about 200 liters ion exchanged water was then added thereto so that a continuous aqueous phase may be formed all over the soil in the container.

Figure 2:
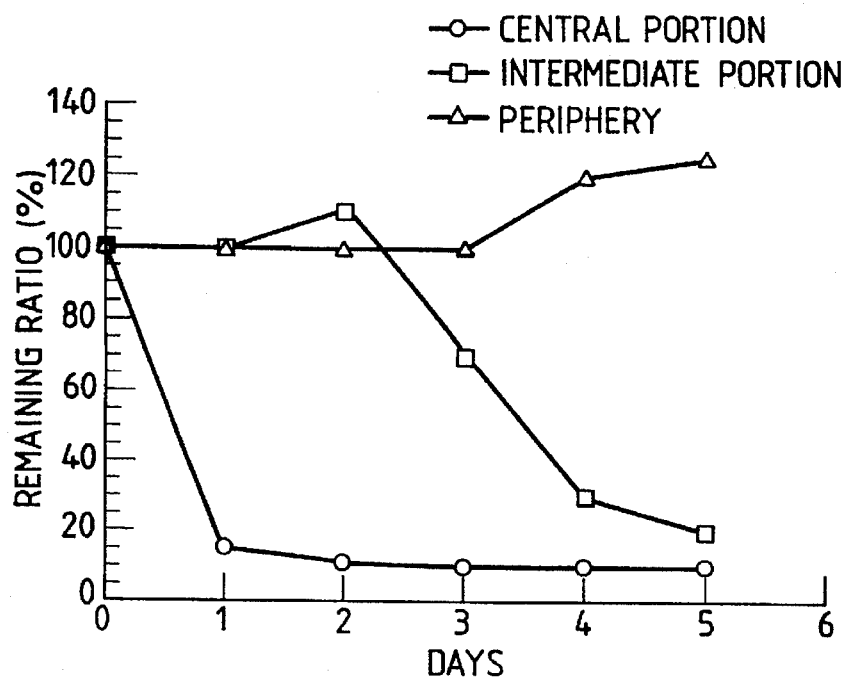
FIG. 2 is a graph showing a change with time of remaining ratios of protozoa (which are calculated regarding the number of the protozoa at the time of the start of an experiment as 100%) at sampling sites in Example 1.

Next, 200 g potassium chloride solid powder which was a substance for inducing negative chemotaxis in protozoa was added to the soil surface at the central portion of the container. In this case, 1 g the soil was sampled at a depth of 10 cm from the surface at three positions in the container, i.e., at the central point (the addition point), a point separated 25 cm from the central point and a peripheral point before and after the addition of potassium chloride, and the numbers of bacteria and protozoa were counted by visual observation through an optical microscope. Immediately after the sampling from the outdoors, the numbers of the bacteria and protozoa in the Kanuma soil were $5 \times 10^7$ and $3 \times 10^5$ per gram of the soil, respectively. The obtained results are shown in FIGS. 1 and 2. As is apparent from the results in FIGS. 1 and 2, potassium chloride was diffused toward the periphery of the soil, so that the negative concentration gradient of potassium chloride was formed from the central portion to the periphery of the soil. In consequence, the chemotaxis of the protozoa was induced to move the protozoa to the periphery, and it was confirmed that the bacteria were not of being eaten by the protozoa and they remained at the addition point and its periphery.

EXAMPLE 2

Figure 3:
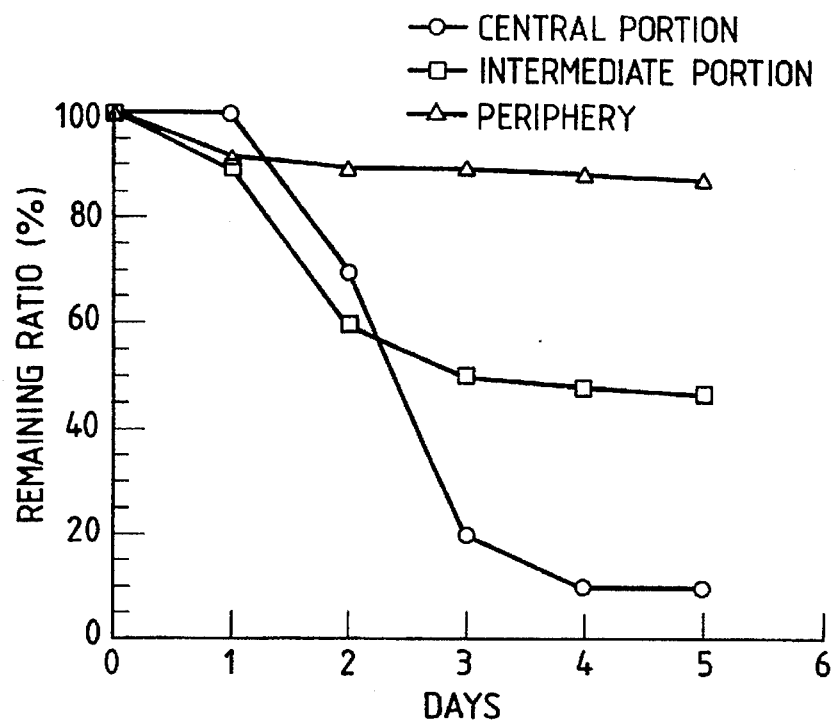
FIG. 3 is a graph showing a change with time of remaining ratios of the bacteria (which are calculated regarding the number of the bacteria at the time of the start of an experiment as 100%) at sampling sites in Example 2.
Figure 4:
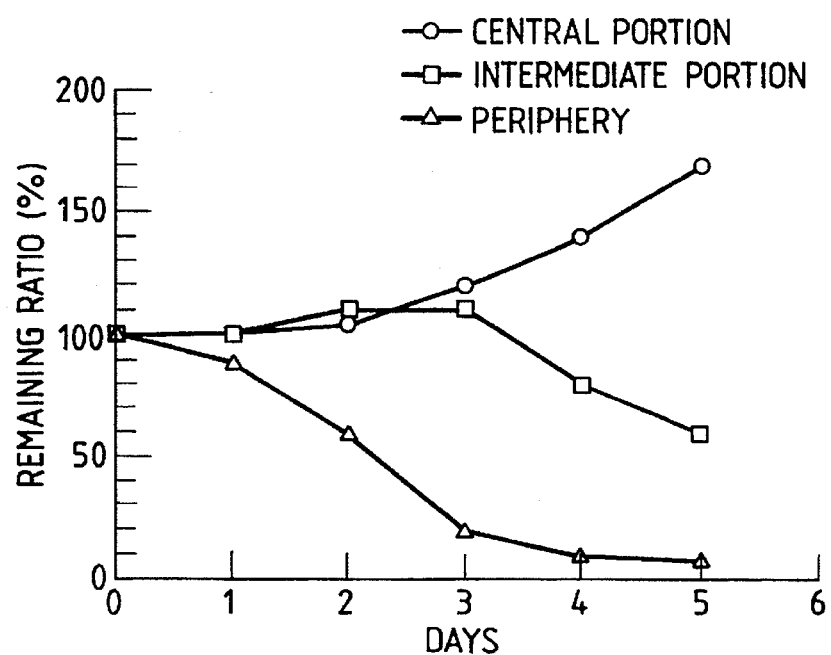
FIG. 4 is a graph showing a change with time of remaining ratios of the protozoa (which are calculated regarding the number of the protozoa at the time of the start of an experiment as 100%) at sampling sites in Example 2.

A model soil was treated by the same procedure as in Example 1 except that potassium chloride was replaced with a glucose solid powder (500 g) for inducing positive chemotaxis in protozoa. The obtained results are shown in FIGS. 3 and 4. As is apparent from the results of these drawings, glucose was diffused toward the periphery of the soil, so that the negative concentration gradient of glucose was formed from the central portion to the periphery of the soil. In consequence, the chemotaxis of the protozoa was induced to move the protozoa to the central portion, and it was confirmed that the bacteria were not eaten by the protozoa and they remained at its periphery.

EXAMPLE 3

Figure 5:
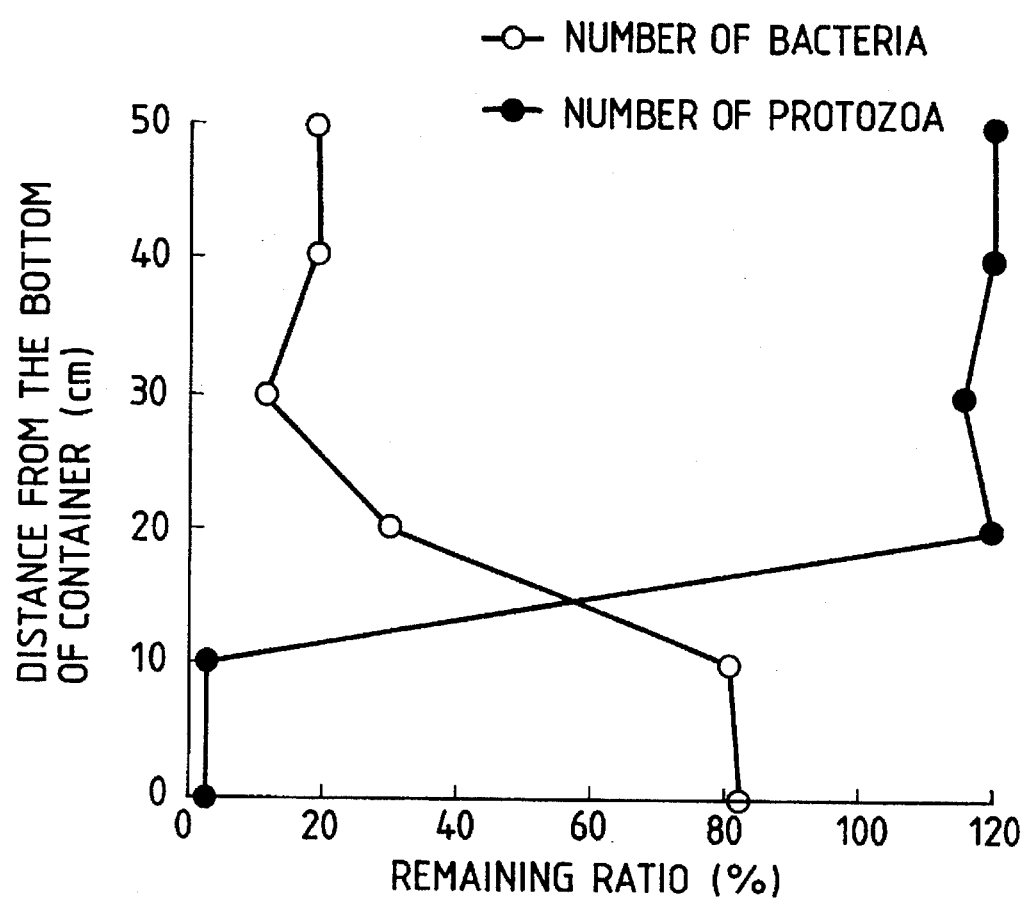
FIG. 5 is a graph showing remaining ratios of the bacteria and protozoa (which are calculated regarding the number of each of the bacteria and protozoa at the time of the start of an experiment as 100%) at sampling sites at different intervals from the bottom of a container in Example 3.

A pair of water-supplying and draining tubes having 10 cm diameter was arranged at the both ends of lower portions of a rectangular container having a length of 1 m, a width of 10 cm and a height of 50 cm. This container was then filled with a fine sand for horticulture. A gaseous phase ratio in this state was 18.4%. The numbers of the bacteria and protozoa in the fine sand were $7 \times 10^6$ and $5 \times 10^5$ per gram of the soil, respectively. Afterward, a 0.1M potassium chloride solution was caused to flow at a flow rate of 0.4 liter per day through the water-supplying tube from one end of the lower portion of the container. In this example, the flow velocity of the water flow in the container corresponded to a flow velocity of underground water flow of about 0.2 m per day. After 7 days, the soil was sampled in a vertical direction of the container, and the numbers of the bacteria and protozoa were counted. As shown in FIG. 5, the negative concentration gradient of potassium chloride was formed in an upward direction of the container, so that the protozoa which was alive in the lower portion of the container moved to its upper portion, whereby the bacteria were not eaten by the protozoa and they remained in the water belt region in the lower portion.

What is claimed is:

1. A process for remediating a polluted environment in which a microorganism capable of degrading a pollutant and a predatory microorganism for the microorganism capable of degrading a pollutant are present in said polluted environment, which comprises:

applying a substance to the polluted environment (i) to eliminate the predatory microorganism from a region of the polluted environment to be decontaminated and (ii) to accelerate the degradation of the pollutant in said region by the microorganism capable of degrading a pollutant.

2. The bioremediation process according to claim 1 wherein the substance induces chemotaxis of the predatory microorganisms.

3. The bioremediation process according to claim 2 wherein a substance for inducing a negative chemotaxis of the predatory microorganisms is added to the region to be decontaminated.

4. The bioremediation process according to claim 2 wherein a substance for inducing a positive chemotaxis of the predatory microorganisms is added to a region adjacent to the region to be decontaminated.

5. The bioremediation process according to claim 1 wherein the pollutant-degrading microorganisms are bacteria, and the predatory microorganisms are protozoa.

6. The bioremediation process according to claim 1 wherein the pollutant-degrading microorganisms are indigenous bacteria.

7. The bioremediation process according to claim 1 wherein the pollutant-degrading microorganisms are foreign bacteria.

8. The bioremediation process according to claim 1 wherein the region to be decontaminated forms a continuous layer of water.

9. The bioremediation process according to claim 8 wherein the region to be decontaminated is a saturated layer.

10. The bioremediation process according to claim 8 wherein the region to be decontaminated is an underground water layer.

11. The bioremediation process according to claim 8 wherein water in an amount enough to form the continuous layer of water is fed to the region to be decontaminated which is an unsaturated layer.

12. A process according to claim 1, wherein the environment is a soil water system.

* * * * *